(12) United States Patent
Rose (10) Patent No.: US 6,313,794 B1
(45) Date of Patent: Nov. 6, 2001

(54) METHOD OF DETECTION AND DETERMINING AN ANGULAR LOCATION OF FREQUENCY AGILE EMITTERS

(75) Inventor: Conrad M. Rose, King George, VA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/487,209

(22) Filed: Jan. 19, 2000

(51) Int. Cl.[7] .................................................. G01S 5/02
(52) U.S. Cl. .......................... 342/424; 342/442; 342/444; 342/445
(58) Field of Search .................................. 342/156, 424, 342/434, 442, 444, 445

(56) References Cited

U.S. PATENT DOCUMENTS

| | | | |
|---|---|---|---|
| 5,592,181 | * | 1/1997 | Cai et al. ............................. 342/457 |
| 5,608,411 | * | 3/1997 | Rose ..................................... 342/417 |
| 5,724,047 | * | 3/1998 | Lioio et al. .......................... 342/442 |
| 5,999,129 | * | 12/1999 | Rose ..................................... 342/394 |
| 6,184,830 | * | 2/2001 | Owens ................................. 342/424 |

* cited by examiner

Primary Examiner—Dao Phan
(74) Attorney, Agent, or Firm—Lowe Hauptman Gilman & Berner, LLP (57) ABSTRACT

The present invention uses feedback 300 from RF carrier frequency measurements 301 to disassociate the emitter angle-of-arrival component 313 in the ambiguous phase measurement 312 from the initially unknown phase measurement integer ambiguities 314; to then process 302 resolve the ambiguities; and finally to process 303 to obtain the correct emitter AOA. The present invention does this by converting the actual interferometer baselines 315 on which the unassociated pulse 308 phase measurements 304 were made at different emitter frequencies to a baseline set 305 for a single-frequency equivalent interferometer array. This conceptual array has the following property: the phase measurement 306 that would be made on it at the fixed frequency for a signal at the same direction-of-arrival 307 are identical to the actual phase measurements made on the physical array. Because of this equivalency the conceptual array is called the E(equivalent)-array. But, whereas the physical array has antenna spacings 317 that are invariant, the E-array "antenna" spacings 316 change as a function of the RF carrier frequency measurement feedback 300, which depends on the particular residual pulses being tested. Thus there is a different E-array, even for the same frequency agile emitter, depending on the particular residual pulse set 309 used.

34 Claims, 7 Drawing Sheets

METHOD OF DETECTION AND DETERMINING AN ANGULAR LOCATION OF FREQUENCY AGILE EMITTERS

FIELD OF THE INVENTION

The present invention relates to a method and apparatus of detecting and determining an angular location of frequency agile emitters, and more particularly, to a method and apparatus which allows Electronic Warfare Support Measures (ESM) intercept receivers to identify and locate in angle frequency agile emitters from nonmonopulse interferometer phase measurements.

BACKGROUND OF THE INVENTION

Radio frequency interferometer design techniques, e.g. as described by Robert L. Goodwin, in "Ambiguity-Resistant Three and Four Channel Interferometers" (Naval Research Laboratory, Washington, D.C. Report 8005 Sep. 9, 1976), typically assume the same RF carrier frequency for all pulses used to resolve the phase ambiguities and locate the transmitter in angle. This assumption is always valid if monopulse techniques are used in making the phase measurements. However, monopulse measurements require a separate receiver pair and phase detector for each interferometer baseline (FIG. 1), and are therefore expensive in terms of both weight and cost.

Figure 1:
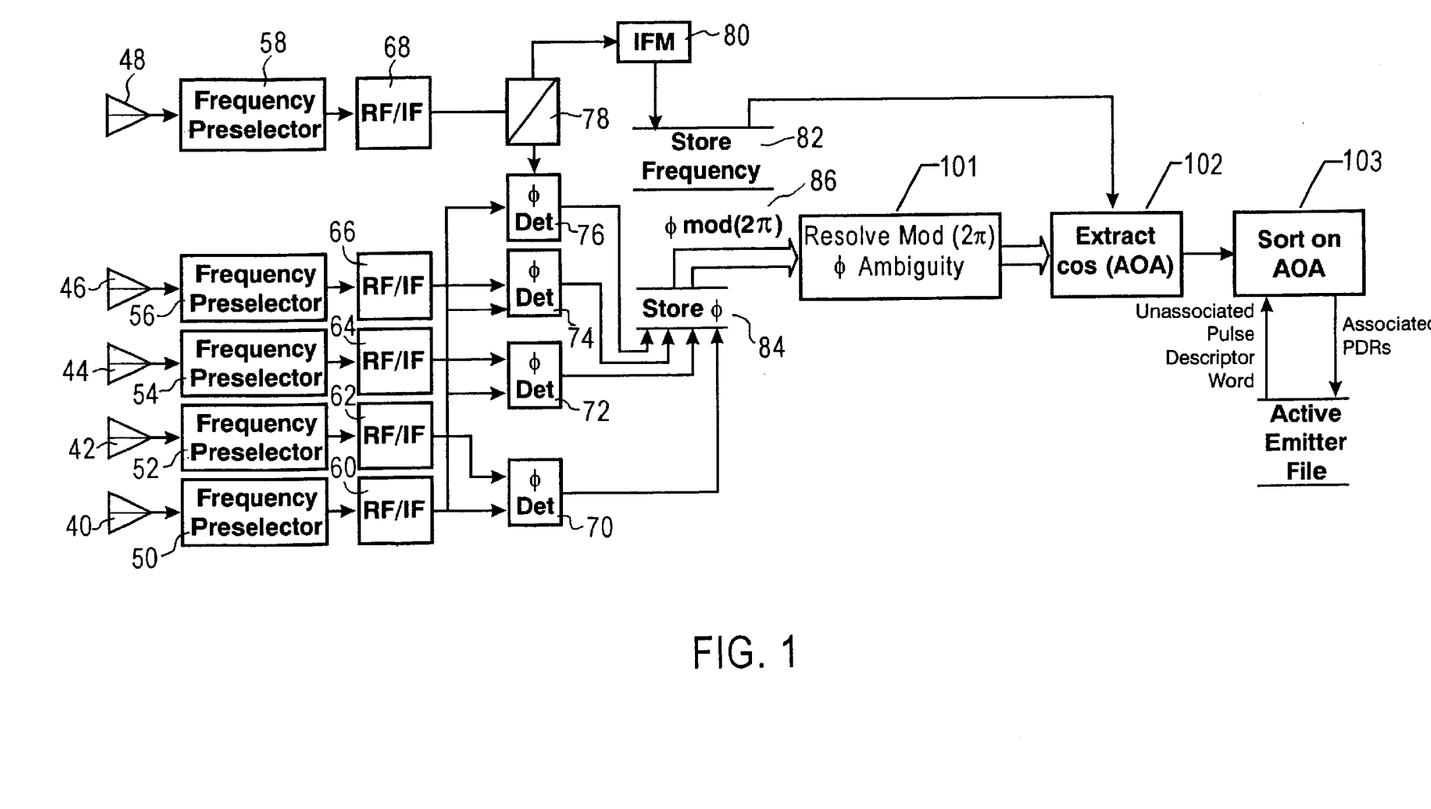
FIG. 1 depicts a conventional monopulse interferometer system.

As depicted in FIG. 1, one such system includes the separate receiver pair and phase detector and includes antennas 40, 42, 44, 46, 48 coupled to frequency preselectors 50, 52, 54, 56, 58, respectively. Receivers 60, 62 and 64, 66 form receiver pairs. The frequency preselectors 52, 54, 56, 58 are in turn coupled to RF/IF receivers 60, 62, 64, 66, 68, respectively, which are in turn coupled to phase detectors 70, 72, 74, 76, respectively. Power divider 78 splits the received signal and is coupled to an instantaneous frequency measurement device (IFM) 80 and to phase detector 76. Phase detectors 70, 72, 74 and 76 are coupled to phase storage 84. The phase difference $\phi$ induced by the signal direction-of-arrival is measured modulo ($2\pi$) 86 by the individual phase detectors associated with each particular antenna, with antenna 40 as the reference. The measured phase is then stored in memory 84. The IFM 80 provides measurements to a frequency storage 82. The $\phi$ mod ($2\pi$) measurements 86 are resolved at a resolve mod($2\pi$) $\phi$ ambiguity 101 process, and then the spatial signal angle of arrival (AOA) derived in a COS (AOA) process 102, which is performed using frequency storage 82 and the resolved mod($2\pi$) $\phi$ ambiguity 101. At process 103 the AOA and associated pulse data records or PDRs are provided to an active emitter file 104.

Figure 2:
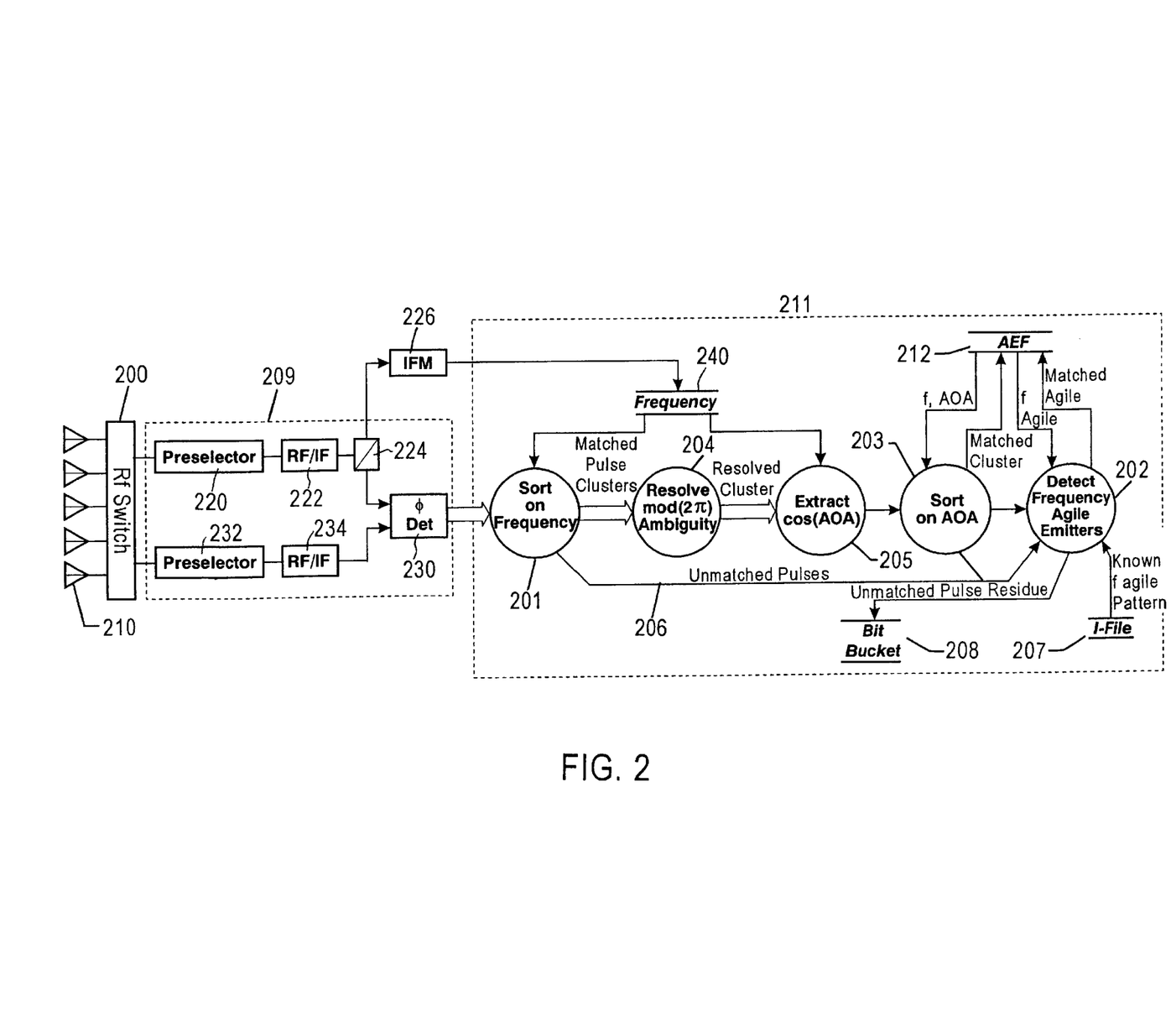
FIG. 2 depicts a conventional interpulse switched interferometer.

FIG. 2 illustrates a conventional approach to reducing the number of receivers and phase detectors required by using a baseline switch in the interferometer implementation. The conventional interferometer includes a plurality of antennas 210. The antennas 210 are coupled to an RF switch 200. The RF switch 200 is coupled to a phase detection section 209 which includes a preselector 220 coupled to an RF/IF receiver 222 which is coupled to a splitter or power divider 224. Splitter 224 is in turn coupled to an IFM 226 and a phase detector 230. The RF switch 200 is also coupled to a second preselector 232 which is also coupled to an RF/IF receiver 234. Both splitter 224 and RF/IF receiver 234 are coupled to the phase detector 230. The phase detector 230 is coupled to a sort on frequency process 201. The IFM 226 is coupled to a frequency storage device 240. The sort on frequency process 201 is coupled to a resolve mod ($2\pi$) ambiguity 204. The resolve clusters are forwarded to process 205 angle measurement extraction 205. The extracted AOA is forwarded to a sort on AOA process 203. The frequency storage 240 provides frequency measurements to processes 201 and 205. A bit bucket 208 contains pulses from frequency agile radars which are unassociated with previously detected frequency agile emitters and end up in a pulse residue collection. The I-file 207 provides known frequency agile patterns.

Baseline switching, e.g., using an RF switch 200 (FIG. 2) to connect a single pair of receivers and phase detector 209 sequentially between interferometer antennas 210 can be used to save cost and weight. When implementing the baseline switching approach, intrapulse switching retains the monopulse performance. However intrapulse switching has drawbacks due to increased vulnerability to multipath. Multipath corrupts the trailing edge of received radar pulses, but not the leading edge; therefore it is most desirable to use phase measurements near the leading edge of a pulse. But typically the cumulative time required to sequentially sample the phase in intrapulse switching means at least some baseline phase measurements are made well back from the leading edge.

To allow phase measurements on the pulse leading edge, while still reducing the number of receivers used, interpulse switching can be employed. This alternative to monopulse switches the single receiver-pair and phase detector set between baselines to catch the leading edge of each pulse used to make the phase measurement. In this method the minimum number of pulses collected for a single emitter equals the number of interferometer baselines. But more pulses than this minimum number are typically collected. For example the intercept receiver tune strategy can be structured with dwells long enough to detect at least two pulses for the longest emitter pulse repetition interval expected.

Although interpulse switching saves weight and cost while reducing vulnerability to multipath, it introduces new problems. In particular, nonmonopulse switching makes the identification and location of frequency agile radars difficult. As used herein, nonmonopulse switching is identical to interpulse switching. Radars use frequency agility either as an electronic counter countermeasure (ECCM), or to enhance performance. As an example of performance use, many sea borne radars use frequency change every 10 ms to 100 ms to electronically steer the antenna beam. An ECCM application is frequency hopping within a bandwidth, possibly extending over 1 GHz, to reduce the vulnerability of surface-to-air missile systems to jamming.

Thus the change in transmitted frequency can be on a pulse-by-pulse or pulse-batch to pulse-batch basis with the RF carrier frequency of the pulse perturbed in either a random or preprogrammed fashion. But even if deterministic at the transmitter, the frequency change schedule is typically such that the frequency of the next pulse or pulse group cannot be reliably predicted from the frequency of the current pulse by ESM processing. A consequence of this unpredictability is that frequency hopping creates two serious problems for the intercept receiver: the inability to do pulse cluster-to-emitter association, and the inability to do precision emitter location in angle.

These problems arise because in a single frequency dwell the wideband ESM receiver collects pulses from many different emitters within tune bandwidths typically covering 500 MHz to 800 MHz. These pulses must be sorted or clustered by correctly associating the pulses with the individual radars. Hence, with both fixed-frequency and frequency-agile emitters, the interpulse switched system must augment the basic interferometer signal processing elements of resolving phase measurement ambiguities and extracting the signal angle-of-arrival or AOA measurements (101 and 102 FIG. 1) with the additional processing 201 and 202 shown in FIG. 2. For the monopulse system, linking pulses to emitters can simply be done using angle measurements and angle predictions alone in 103, but in the interpulse system, location in angle (processes 204 and 205) and pulse-to-emitter association 203 through angle comparison, must be proceeded by pulse frequency clustering 201.

This preliminary frequency sort occurs first in an interpulse switched system because it must compensate for the nonmonopulse interferometer baseline phase sampling, associating all the pulses from a fixed-frequency emitter so that the ambiguity resolution and AOA estimation processes 204 and 205 can be performed on the frequency-clustered pulses. If this key measurement, frequency, is not available as a sorting parameter, e.g., if the emitter is frequency agile, the pulses from the radar will not form a cluster associated with a single emitter, and hence must bypass from the sort on frequency process 201 directly to the detect frequency agile emitters process 202. Thus emitter relative bearing cannot be measured and used in cluster association, and, indeed it is not even certain the pulses were transmitted by the same radar. To attempt to do the pulse-to-emitter association alternative processing 202 must be undertaken, beyond that required for the fixed frequency case.

But in current ESM systems there is no really robust alternative to using signal angle-of-arrival when doing pulse-emitter linking. For instance, process 202 typically attempts to use pulse width to perform the association. But, as noted above, interpulse switching as opposed to intrapulse switching is implemented to reduce the sensitivity to multipath pulse distortion effects, and these effects also corrupt and render unreliable pulse width measurement. Known emitter characteristics, such as deterministic frequency hopping patterns, stored in an Identified Emitter database, or I-file 207 are also commonly used. But many agile emitters vary their frequencies in a pseudo random manner, and even radars with deterministic patterns are likely to change those patterns at the outbreak of hostilities, i.e., to use special war modes. Therefore the pulses from frequency agile radars typically remain unassociated with the previously detected frequency agile emitter, and end up in the pulse residue collection or "bit bucket" 208.

But even if the pulses get correctly linked to the radar in process 202, and stored in the active emitter file (AEF) 212, the emitter still does not get located in angle, i.e., as indicated in the data flow portion of FIG. 2, processes 204 and 205 are not revisited after frequency agile emitter pulse association. This is a serious deficiency: emitter relative bearing is an important tactical, as well as ESM parameter. But, as noted previously, ESM interferometers are designed utilizing standard techniques requiring all the phases measured on the different interferometer baselines to be derived from signals at the same RF carrier frequency.

This same-frequency requirement arises from the ambiguity resolution process 101 and 204 needed in both monopulse and interpulse systems. The phase measured on the ith baseline $\vec{d}_i$ of an interferometer is given by $$\phi_i = (2\pi f/c\, \vec{d}_i \cdot \vec{u})_{mod(2\pi)} + \epsilon_\phi \quad (1)$$

or equivalently $$\phi_i = 2\pi f/c\, d_i \sin(AOA) - 2\pi n + \epsilon_\phi \quad (2)$$

where $\vec{u}$ is the direction-of-arrival or DOA unit vector i.e. the signal wave-normal, and c the speed of light. The integer n is the "ambiguity integer", and represents the number of equally possible AOA's. This number is a function of both the emitter signal frequency f and interferometer baseline length $d_i$, satisfying the inequality $$-\frac{c}{2d_i f} \le \sin(AOA) < \frac{c}{2d_i f} \quad (3)$$

If this inequality is true, n is equal to 0 and a unique value of $\phi_i$ may be associated with a single AOA. Equation 3 shows the unambiguous field-of-view, or FOV is inversely proportional to the baseline length. Practical systems also have measurement error $\epsilon_\phi$, as indicated in Equation 1, and this produces an AOA error $$\sigma_{AOA} = \frac{\epsilon_\phi c}{2\pi d_i \cos(AOA)} \quad (4)$$

also inversely proportional to the baseline length and emitter frequency. Equation 3 and Equation 4 establish the somewhat mutually exclusive elements that form the core problem in interferometer design: obtain an accurate angle estimate over a wide field-of-view (FOV) when increasing angle measurement resolution causes the unambiguous FOV to contract. Bishop solved this canonical problem by utilizing baselines long enough to provide the angle resolution needed, but which create ambiguous phase measurements (inequality 3 not satisfied); then resolving the ambiguity by measuring phases on multiple baselines with a special property. This special property is that the lengths of the baselines are prime integer multiples of the greatest common divisor of the antenna spacings. This special condition allows the unknown ambiguity integers to be uniquely estimated, i.e. the AOA ambiguities resolved, if all the phase measurements are made at the same frequency. The solution is done utilizing variations of the Chinese Remainder Theorem, such as those described in J. K. Wolf "The Chinese Remainder Theorem and Applications", Ch.16 in Blake and Poor, *Communications and Networks*, New York, 1986 (incorporated hereby reference in its entirety into this specification). However, the ambiguities cannot generally be resolved and the true emitter AOA estimated if the radar is frequency agile since the phase measurement properties which make the solution possible, that is the properties due to the relative prime integer spacings of the multiple baselines, are destroyed. The Chinese remainder theorem, which is based on doing integer arithmetic, cannot be applied.

Thus, there is a need in the art to overcome the drawbacks to pulse cluster-emitter association and the inability to do AOA estimation currently intrinsic to using interpulse switching against frequency agile radars.

SUMMARY OF INVENTION

It is an object of the present invention to provide a method to simultaneously link the pulses in an unassociated residue to the correct emitter while deriving and refining the emitter's location in angle.

In particular, an object of this invention is to modify the techniques employed for monopulse and non monopulse fixed-frequency interferometry so they can be used to solve the frequency agile pulse-to-emitter association problem. A further object of this invention is to extend the sparse element interferometer ambiguity resolution methods to support real-time changing arrays, and to vary the ambiguity resolution relations in real-time. As noted above, in fixed-frequency phase measurement the difference between the phase detected from one baseline to the next is solely due to the difference in baseline length, and precise knowledge of this exact dependence is exploited to resolve the modulo $2\pi$ phase measurement ambiguity. But with agile-frequency phase measurements this dependence and certainty is destroyed. The phase change is also due to the frequency change, and the specific ambiguity resolution relations developed off-line based on the invariant antenna spacings alone can no longer be used.

Still other objects and advantages of the present invention will become readily apparent to those skilled in the art from the following detailed description, wherein the preferred embodiment of the invention is shown and described, simply by way of illustration of the best mode contemplated of carrying out the invention. As will be realized, the invention is capable of other and different embodiments, and its several details are capable of modification sin various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Although with frequency agile emitters the measured RF carrier frequency cannot be used to associate the pulse with previously detected emitters, the signal AOA, derived from the single pulse phase measurements, provides the critical parameter for reliable pulse-to-emitter linking. The two-antenna baseline phase measurements are performed on separate pulses. If the emitter frequency changes from pulse-to-pulse, the interferometer cannot generate signal AOA, and the pulses cannot be sorted using AOA. For frequency agile radars this means the pulses are not linked to the correct emitter.

The present invention uses feedback 300 (FIG. 3) from RF carrier frequency measurements 301 to disassociate the emitter angle-of-arrival component 313 in the ambiguous phase measurement 312 from the initially unknown phase measurement integer ambiguities 314; to then process 302 resolve the ambiguities; and finally to process 303 to obtain the correct emitter AOA. The present invention does this by converting the actual interferometer baselines 315 on which the unassociated pulse 308 phase measurements 304 were made at different emitter frequencies to a baseline set 305 for a single-frequency equivalent interferometer array. This conceptual array has the following property: the phase measurements 306 that would be made on it at the fixed frequency for a signal at the same direction-of-arrival 307 are identical to the actual phase measurements made on the physical array. Because of this equivalency the conceptual array is called the E(equivalent)-array. But, whereas the physical array has antenna spacings 317 that are invariant, the E-array "antenna" spacings 316 change as a function of the RF carrier frequency measurement feedback 300, which depends on the particular residual pulses being tested. Thus there is a different E-array, even for the same frequency agile emitter, depending on the particular residual pulse set 309 used.

Figure 3:
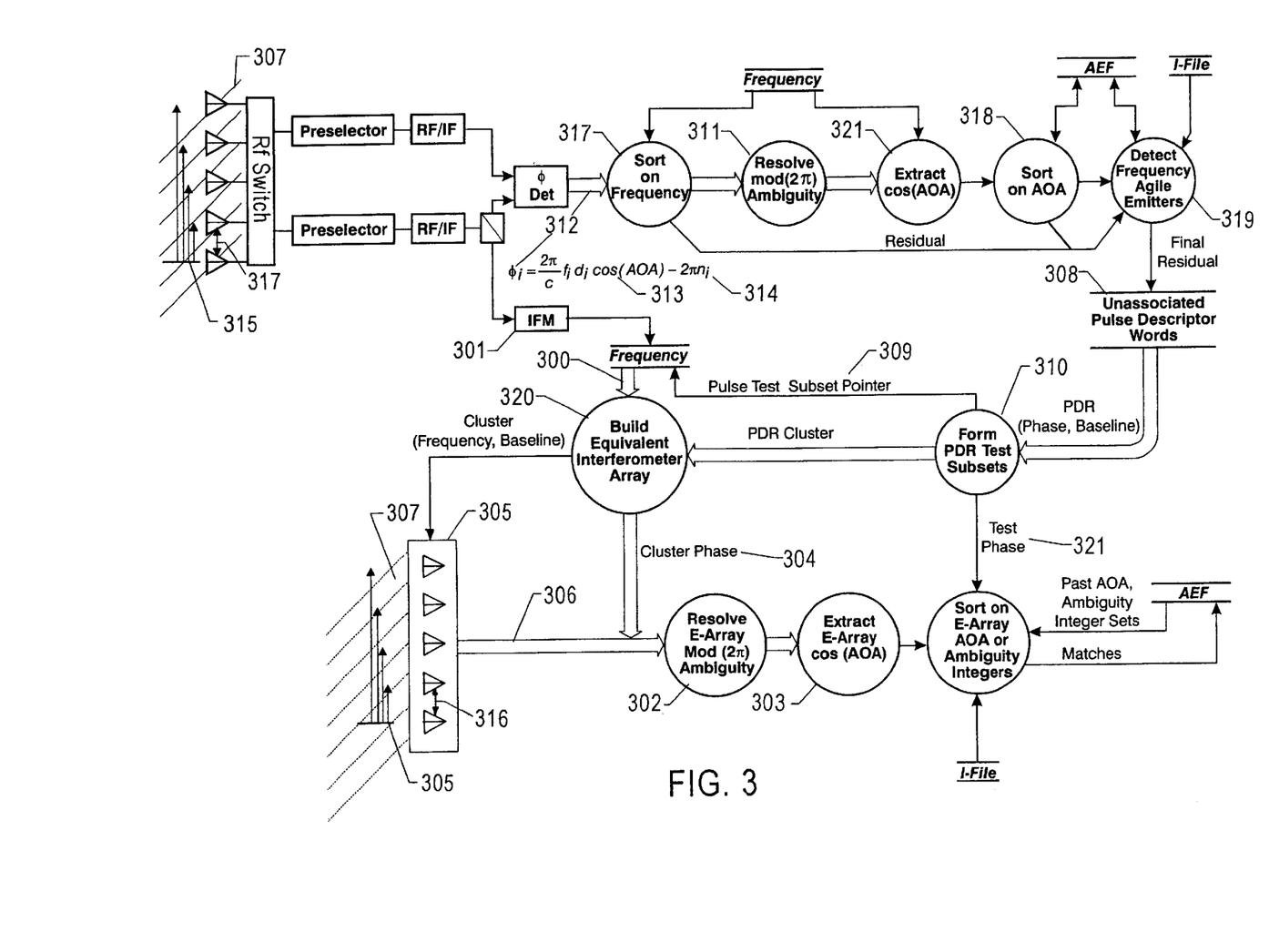
FIG. 3 illustrates how the present invention uses frequency measurement feedback to augment the pulse processing for measurements made with the interpulse switched system in FIG. 2 to make signal AOA available for use as a pulse-to-emitter-linking parameter for frequency agile radars.
Figure 4:
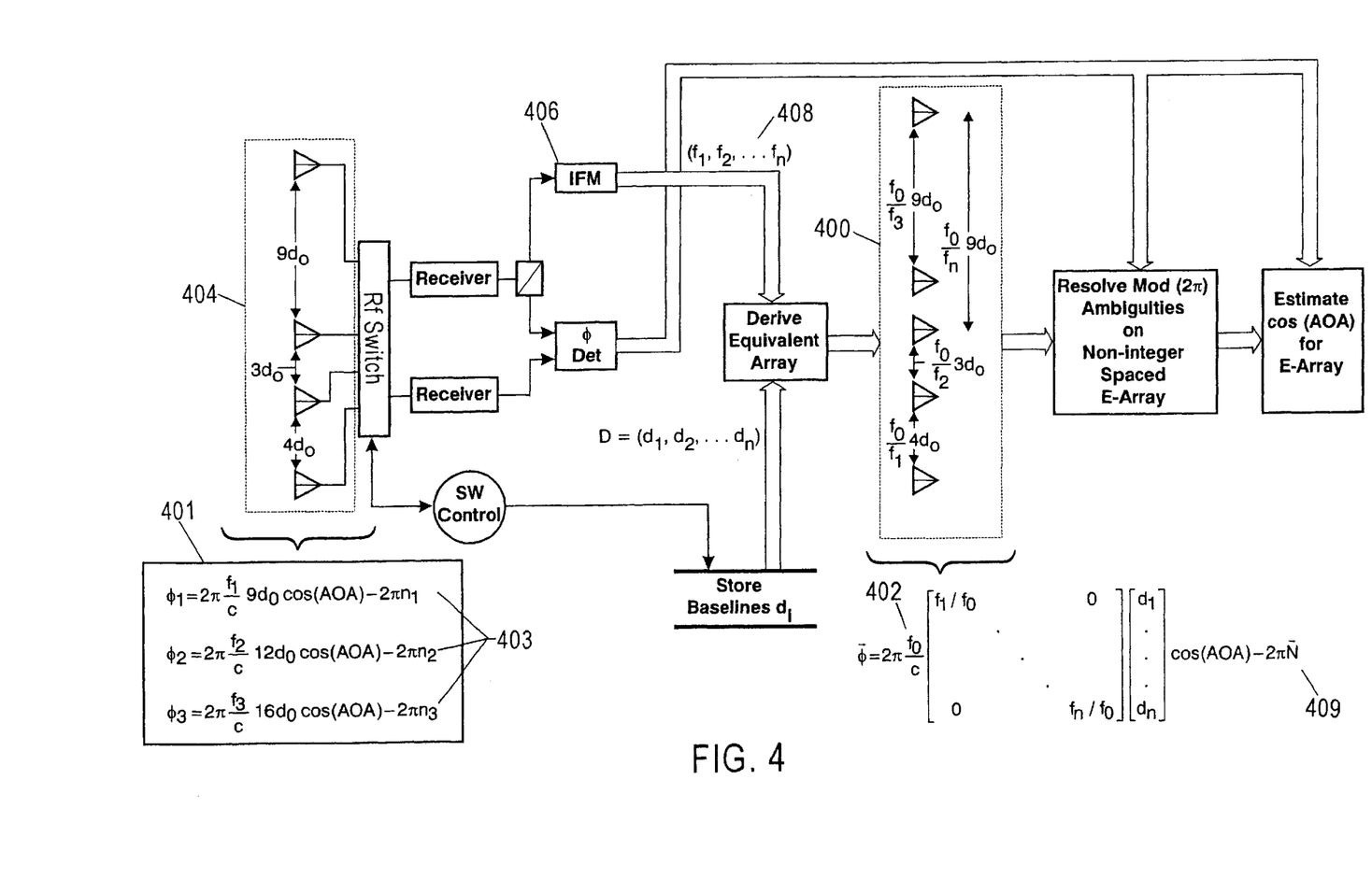
FIG. 4 provides more detail on the relation of the E-array and physical array and further illustrates how the method of the present invention provides location in angle for frequency agile emitters using phase measurements made at different frequencies on the baselines of a conventional interferometer whose baseline spacings were designed for single frequency operation (as indicated by $d_o$)

The E-array is formed as follows. A set of candidate unassociated residual pulses is selected in process 310. The phase of each of these pulses is physically related to the AOA, the interferometer baseline on which it was measured, and the emitter frequency by 401 (FIG. 4). A reference frequency 402 is chosen, theoretically arbitrary, but practically picked based on the frequencies in the subset of the unassociated pulse group selected for testing. Once this reference frequency is determined, the interferometer baselines are redefined, as illustrated in FIG. 4. These new baselines define the E-array. The ambiguity integers 403 are the same 409 for the fixed frequency E-array 400, assuming all pulses are measured at frequency $f_o$, as the physical array 404. They can be found for the E-array, and then the cos(AOA) estimated using extensions of sparse-element interferometer techniques, and in particular extensions to those described by Willis Bishop and further refined by N. Malloy in his 1983 IEEE International Conference on Acoustic, Speech and Signal Processing (ICASSP) paper "Analysis and Synthesis of General Planar Interferometer Arrays", which is incorporated herein by reference in its entirety. Extensions further developed by the present invention are referred to collectively as the Generalized Ambiguity Resolution Method (GARM) algorithm. The GARM approach differs from the Bishop-Malloy methods, or other methods based on the Chinese Remainder Theorem, in not requiring interferometer baselines to form relatively prime integer ratios with one another.

As indicated by R. C. Hansen in *Microwave Scanning Antennas* Volume III (Academic Press, New York, 1966), such relatively prime integer spacing provides an uniform error rate, called the gross error rate, when determining the integer ambiguities across the range of frequencies and field-of-view for which the interferometer is designed. Because of the desirable phase-space characteristics of such "lattice" distances, the physical array will most commonly be designed to incorporate them, and the ambiguity resolution methods described by Malloy or Bishop, and employed in 311 FIG. 3 to resolve phase measurement ambiguities for fixed-frequency emitters, assume such spacings. In particular, to provide this uniform performance, Bishop introduced the use of prime integer multiples of the greatest common divisor of the antenna spacings, $d_0$, where $$d_0 = \frac{\lambda_{hf}}{2} \sin(AOA_{FOV}) \qquad 5$$

with $\lambda_{hf}$ the signal wavelength at the highest frequency of interest and $AOA_{FOV}$ the pulse angle of arrival at the field-of-view limit. Malloy generalized the use of this critical design parameter. But when the E-array is formed, in effect by perturbing the original antenna locations, the relatively prime integer relationships involving $d_o$ are generally lost. The techniques developed by Malloy paper were extended in the GARM algorithm, and are used in this invention to cover noninteger antenna spacings in process 302.

Figure 5:
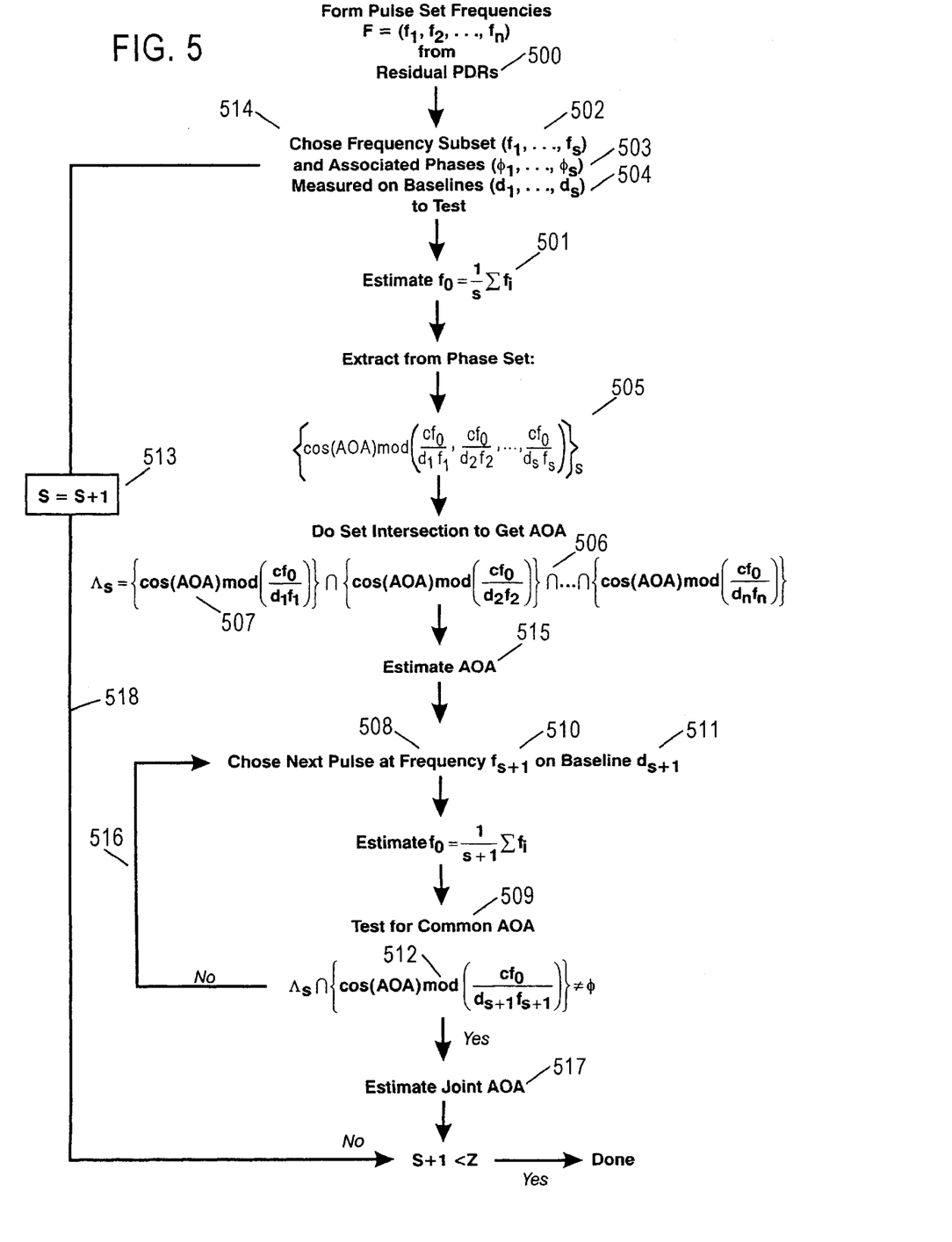
FIG. 5 illustrates the recursive AOA measurement logic used to associate pulses with the correct frequency agile emitter while simultaneously locating the emitter in angle.

Still other changes to current sparse-element interferometer methods are required. The methods described by Malloy or Bishop are conventionally used off-line to design arrays, and then implemented in real time for unvarying antenna spacings. Thus they must also be modified to deal with real-time array design. In particular, the design methods developed by Malloy use the fewest number of antennas to obtain the desired resolution and gross error rate. They are the epitome of sparse element interferometer techniques, exploiting the use of relatively prime integer antenna placement to the fullest. In modifying these approaches for noninteger spacings more baselines must be used to obtain desirable gross error rate performance. The manner in which this is done, and the specific method by which the E-array associated with the actual physical array is used both to match pulses with a frequency agile emitter and to locate that emitter in angle is described later. It will be seen that in contrast to monopulse Direction Finding (DF), which is done before the pulses are associated with the emitter, as indicated in FIG. 1 by the data flow processes 101, 102 and 103, and in contrast to fixed-frequency switched implementations, where pulse sorting based on frequency must proceed estimating the AOA, as indicated by 201, 205 and 206 in FIG. 2, in this invention pulse-to-emitter association and angle location occur in parallel, as shown by FIG. 5 and illustrated in FIG. 6 which are described in detail below.

Referring to FIG. 3, the two channel phase measurements 312 are made with an ESM intercept receiver such as Litton Amecom LR-100. The ESM intercept receiver has an architecture specifically adapted to interpulse phase measurement across multiple antenna baselines. Frequency must be measured accurately on each pulse for which AOA phase is measured, and this is best done using a digital multichannel instantaneous frequency measurement device or IFM (406 FIG. 4 and 301 FIG. 3) such as that described in U.S. Pat. No. 3,617,900 granted to C. Fink, F. Burnham and M. Marks, the disclosure of which is incorporated herein by reference.

In this invention performing the set intersection 506 (FIG. 5) is the key task in simultaneously associating frequency agile pulses with an emitter and locating the emitter in angle. The preferred technique for doing this intersection is the GARM algorithm. The GARM extension to phase ambiguity resolution, for linear interferometer arrays, of the approach given by Malloy in his ICASSP paper is described next, the contents of which are hereby incorporated into this specification in its entirety.

In Malloy's method, for both linear and planar interferometers the multiple baselines and phase measurements satisfy, $$\begin{bmatrix} \phi_1 \\ \phi_2 \\ \vdots \\ \phi_n \end{bmatrix} = \frac{f}{c} \begin{bmatrix} \vec{d}_1 \\ \vec{d}_2 \\ \vdots \\ \vec{d}_n \end{bmatrix} \vec{u} + \vec{n} + \vec{\varepsilon}_\phi \qquad (6)$$

or $$\vec{\phi} = \frac{f}{c} D'\vec{u} + \vec{n} + \vec{\varepsilon}$$

and the baselines have the special property that $$D^1 = PT^t \qquad (7)$$

where P is an array of integers and T is a matrix analogous to $d_0$ in the Bishop approach. Intrinsic to Malloy's method is the existence of another integer matrix B such that $$BP^1 = \vec{0} \qquad (8)$$

Applying B to Equation 6 removes the AOA contribution to the phase change, leaving only the integer part (perturbed by measurement errors):

$$B\vec{\phi} = B(\vec{+in} + \vec{\epsilon}) \qquad (9)$$

Generating suitable $D^r$, P, T and B matrices to obtain the lowest gross error rate and the greatest AOA accuracy with the fewest antennas is an art, an example of which is given in Malloy's ICASSP paper. The mathematical approach underlying it, involving sophisticated integer arithmetic, is described by J. W. S. Cassels in *An Introduction to the Geometry of Numbers*, Springer-Verlag, Berlin, 1997, which is incorporated herein by reference in its entirety. The process involving B in the ambiguity resolution occurs in 101 (FIG. 1), 204 (FIG. 2) or 311 (FIG. 3). The present invention resolves the ambiguities in the phase measurements in process 302 utilizing a relationship similar to that of Equation 8; but with the E-array no integer matrix P exist, so the method's mathematical underpinnings are based on the floating point techniques described and incorporated by reference in its entirety in G. H. Golub and C. F. Van Loan, *Matrix Computations*, The Johns Hopkins Press, Baltimore, 1983, rather than Cassels. Thus, extending Malloy's method in the GARM approach, a matrix G is found such that, in place of Equation 8

$$GD^1 = \vec{0} \qquad (10)$$

G is analogous to B, but has elements that can be real numbers rather than strictly integers. Using Equation 10 as the basis for phase resolution, rather than Equation 9 means the optimal sparse element aspects of the physical array 315 are lost, but this is compensated, in this application, by its much greater generality. This generality allows GARM to be used when the single-frequency model of Equation 6 gets altered, as shown next, for frequency agile phase measurements.

When the pulses measured on each baseline are from the same emitter but at a different frequency the phase measurements are, in contrast to Equation 6, $$\begin{bmatrix} \phi_1 \\ \phi_2 \\ \vdots \\ \phi_n \end{bmatrix} = \frac{2\pi}{c} \begin{bmatrix} f_1 & 0 & 0 & \cdots & \cdots & 0 \\ 0 & f_2 & & \cdots & & 0 \\ \vdots & \vdots & \vdots & \vdots & \vdots & \vdots \\ 0 & \cdots & & & & 0 \\ 0 & 0 & \cdots & \cdots & 0 & f_n \end{bmatrix} \begin{bmatrix} \vec{d}_1 \\ \vec{d}_2 \\ \vdots \\ \vec{d}_n \end{bmatrix} \vec{u} + 2\pi\vec{n} + \vec{\varepsilon}_\phi \quad (11)$$

Whereas an integer matrix B cannot be found such that Equation 8 now holds, using the GARM approach G can be found such that $$GD_{new}^{\prime 1} = \vec{0} \quad (12)$$

where $$D'_{new} = \begin{bmatrix} f_1 & 0 & 0 & \cdots & \cdots & 0 \\ 0 & f_2 & & \cdots & & 0 \\ \vdots & \vdots & \vdots & \vdots & \vdots & \vdots \\ 0 & \cdots & & & & 0 \\ 0 & 0 & \cdots & \cdots & 0 & f_n \end{bmatrix} \begin{bmatrix} \vec{d}_1 \\ \vec{d}_2 \\ \vdots \\ \vec{d}_n \end{bmatrix} \quad (12)$$

Thus, for the generalized ambiguity resolution algorithm, Equation 1 is equivalent to a fixed-frequency interferometer receiving a signal at 1 GHz, with phase detected across baselines $$D'_{new} = \begin{bmatrix} f_1 \vec{d}_1 \\ f_2 \vec{d}_2 \\ \vdots \\ f_n \vec{d}_n \end{bmatrix} \quad (14)$$

To enhance numerical processing the fixed frequency can be used as a scale factor. So if the equivalent frequency is assumed to be $f_o$, then $$D'_{new} = \begin{bmatrix} \frac{f_1}{f_o} \vec{d}_1 \\ \frac{f_2}{f_o} \vec{d}_2 \\ \vdots \\ \frac{f_n}{f_o} \vec{d}_n \end{bmatrix} \quad (15)$$

Thus by transforming the signal model of the phase measurements from the real one with pulses at different frequencies to a virtual but equivalent one at a fixed frequency, the GARM algorithm and software, implementing that algorithm, previously developed for fixed-frequency interferometers as described in detail above, can be used with no change. Furthermore, the E-array can utilize as many valid 320 phase measurements as were captured at step 308 by the pulse sorting to create new baselines. Thus the detection of many unassociated pulses, heretofore a liability, is advantageously converted into an asset by this invention since it potentially allows the virtual creation of a linear interferometer with many baselines, certainly more than could be practically implemented in a physical array, and this large number of baselines can compensate for the lack of relatively prime integer spacings. However the E-array must be created with pulses that have been correctly linked to the agile radar.

The first task in correctly clustering the frequency agile pulse data reports (PDRs), i.e. in testing the subset of residual pulses formed in the sorting chain 317, 318 and 319 and selected in process 310 (FIG. 3), to determine if they are from the same radar, is to create a linked pulse set 500. The next task is to pick a subset 502 of the frequency set 500, and to estimate the mean 501 (FIG. 5) of the associated frequency set 502 to get the fixed reference frequency $f_o$. Although $f_o$ is theoretically arbitrary, using the mean frequency prevents numerical instabilities when implementing the E-array ambiguity resolution process 302 and undertaking angle-of-arrival extraction 303.

After extracting the mean frequency, the associated ambiguous phases 503 measured on the baselines 504 are resolved by finding the intersection 506 of the cos(AOA) modulo $$\frac{cf_0}{d_i f_i} \quad (16)$$

The first time through this process, the number s of pulses being tested is one from each baseline, so the intersection 506 include a single resolved phase measurement. When the next pulse 508 is selected from the residual set by process 310 (FIG. 3), the ambiguous cos(AOA) are found in a manner identical to the step 505, and this ambiguity set intersected 509 with that of 507. If the intersection is nonempty, the pulse frequency 510, baseline 511 and phase 322 (FIG. 3) are added to set 502, 504 and 503 respectively. The counter s is then incremented 513 to the number of baselines n plus one.

With s equal to n+1, the intersection 506 is equivalent to an n+1 baseline interferometer, and provides a further refined estimate of the cos(AOA). Unlike the physical array, the E-array can keep growing until all the pulses in the test set (309, 310) have been checked. The additional baselines are utilized not only for reducing the gross error rate in doing ambiguity resolution 302, but also to provide many redundant measurements of cos(AOA) to allow maximum likelihood estimation of the signal angle-of-arrival. Because of the large number of baselines that may be formed, this estimate can be more accurate then the physical array would achieve at the same signal-to-noise ratio for an emitter at fixed frequency.

Figures 6, 6A:
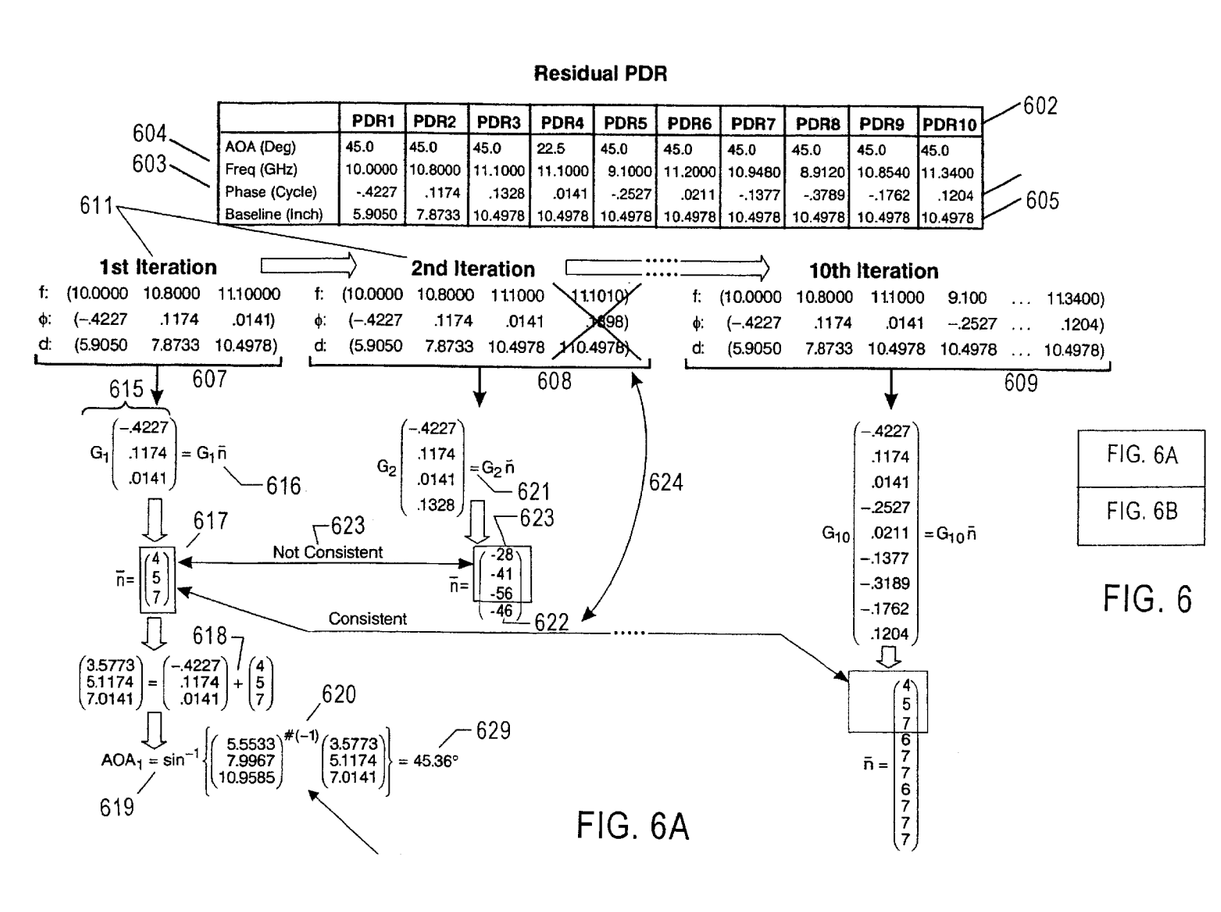
FIG. 6 illustrates the logic flow illustrated in FIG. 5, and the E-array-physical-array relationship illustrated in FIG. 4 for the specific example of an interferometer where 3, 4 and 9 represent the relatively prime integer antenna spaces and 10 pulse data reports measured at different frequencies are processed.
Figure 6B:
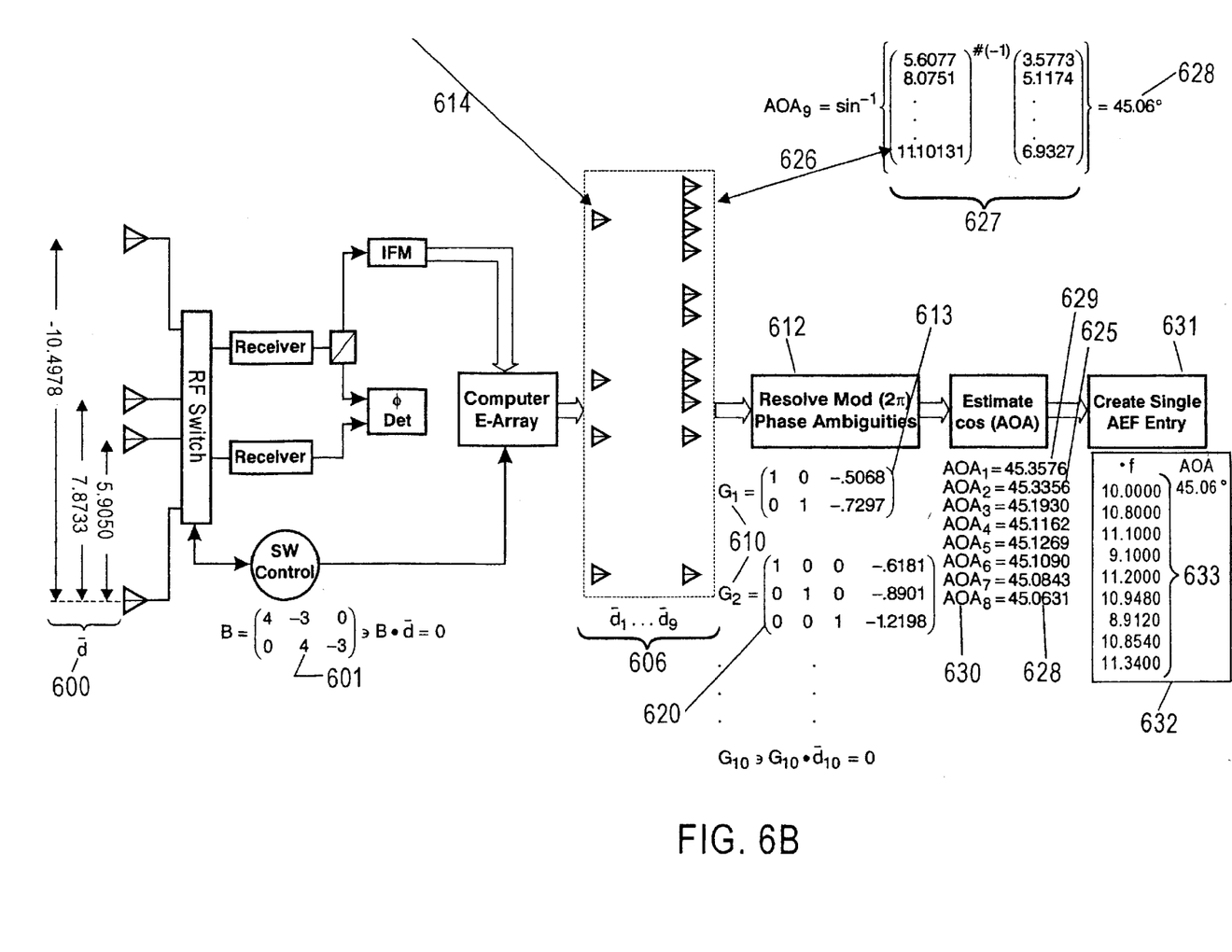

FIG. 6 provides a specific example to illustrate in more detail the relationship between the physical array and the E-array in FIG. 4, and the processing logic shown in FIG. 5. The physical array 600 has the relatively prime integer spacings $$P = \begin{bmatrix} 16 \\ 12 \\ 9 \end{bmatrix} \quad (17)$$

and so examining the null space associated with P gives, according to the Bishop-Malloy approach $$B = \begin{bmatrix} 4 & -3 & 0 \\ 0 & 4 & -3 \end{bmatrix} \quad (18)$$

as indicated by 601. B can be used to resolve the phase measurement ambiguities, as described in Malloy's ICASSP paper. But now assume unassociated pulse descriptor records, or PDRs 602 are created, with the phase measurement sequence 603 and frequency measurement sequence 604 on interferometer baselines 605. Then the E-array may be built sequentially as shown by 606, different for each associated set of PDR phases, baselines and frequencies 607, 608 and 609 and requiring a different G 610 with each update of s (513, FIG. 5, and 611 FIG. 6). The baselines used in the E-array are determined in step 505, in process 310 (FIG. 3). The initial three baselines are chosen in set 607 to give the smallest number of ambiguities to resolve. These ambiguities are resolved in 612 by finding a basis 613 for the null space associated with the equivalent array baselines 614. By comparing the projection 615 of the measured phases on the null space basis set with the projection 616 of possible ambiguity integers, the ambiguity integers 617 are estimated. This represents the preferred method for implementing the set intersection 506, FIG. 5. These integers are used 618 to resolve the measured phase, and the emitter AOA is estimated 619 from the resolved phase. The notation 620 indicates the pseudo inverse, which is formed from the E-array baselines 614. The measurement error covariance matrix can be included in this estimation process to provide a true maximum likelihood estimator, and this represents the preferred implementation of 515, FIG. 5. For this example the error on the phase measurements has a 1 value of 12 electrical degrees. This error is typically for low SNR signals detected near the LR-100 receiver threshold of an ESM intercept receiver such as the LR-100.

The second step 508 in the logic flow in FIG. 5 is to get the next PDR to test, as indicated by 608 FIG. 6. The E-array now includes four baselines, and GARM generates the new null space basis set $G_2$ 620. The projection comparison 621, results in the ambiguity integer set 622. The integers 623 corresponding to the phases in the initial set 607 do not match the integers 617. Therefore $PDR_4$ is not associated with the same emitter as the set 607, and hence is rejected 624. In fact the true AOA sequence 625 shows that the AOA associated with this PDR is 22.5°, while the AOA associated with the other PDRs is 45.0°. This second step processing represents the preferred implementation of 512 and 509 in FIG. 5.

In this example branch 516 is taken, and $PDR_5$ added to set 607 to form a new four baseline E-array. This set results in a consistent ambiguity integer test, and hence the AOA estimate is updated 517, giving the estimate 625. Now branch 518, FIG. 5, is chosen and s incremented 513. The iterative process continues until s=9 in the example, resulting in the final ten baseline E-array set 626. When this set is used to derive 627, the emitter angle-of-arrival, the resulting estimate 628 is much more accurate than the first estimate 629 made with the three baseline array. As indicated by the sequence 630, the AOA estimation accuracy of the E-array improves with each iteration, and the final number of baselines used can be equal to the number of pulses detected from the same frequency agile emitter. That is, no one-to-one correspondence is necessary between the baselines of the physical array and those in the E-array. An important consequence of this is that the current invention not only enables frequency agile emitters to be located in angle, but allows that process to be carried out to a potentially greater accuracy than the physical array obtains for fixed frequency emitters in the same receiver tune bandwidth.

The final AOA estimate 628 is saved in the single emitter AEF record 632 create by process 631. The frequency sequence 633 associated with the AOA estimate is incorporated into the AEF report. This illustrates another important aspect of the invention. The initial frequency sort 317, FIG. 3, required as a first step in pulse clustering for fixed-frequency emitters prior to obtaining emitter AOA 321, has been totally eliminated. Frequency association is now an output of the clustering process and AOA estimation process.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An apparatus for simultaneously associating frequency-agile transmitter signals detected by an intercept receiver with the frequency-agile transmitter, and measuring the signal's angle-of-arrival (AOA), using phases measured between antenna pairs at diverse frequencies, comprising:

a multiple baseline interferometer, a receiver pair associated with a single phase detector, an RF switch to connect the receiver-phase detector unit across the interferometer baselines to measure ambiguous phase, a frequency measurement device to measure signal frequency for each signal whose ambiguous phase is measured between interferometer antenna pairs, memory to store the phase, frequency and baseline length on which the phase was measured, selection logic for choosing a subset from the set of all measured ambiguous phases such that one phase measurement is selected for each interferometer baseline, phase ambiguity resolution logic for determining the integer, for each ambiguous phase measurement in this subset, such that when added to the ambiguous phase measurement this integer generates the resolved phase, correct to within the system measurement error, selection logic for choosing a single phase from the set of remaining ambiguous phase measurements, each made at frequencies distinct to within the resolution of the frequency measurement device, and appending this new phase to the set of previously chosen ambiguous phases, first iterative logic for repeating the steps of generating the ambiguity integers and resolving the phase ambiguities, comparing means for comparing the integers found by the iterative logic with the integers resolving the smaller set of ambiguous phase measurements made by the selection logic, memory for storing the new set of associated measured phases, the frequencies and interferometer baselines across which the phase measurements were made if the integer comparison is exact, or store the previous set of associated phases if the comparison is not exact, second iterative logic for appending a single new phase measurement to the associated set, resolving the phases of the enlarged set, and comparing the ambiguity integers found for the enlarged set with those found for the previous set, until all the frequency diverse measured phases have been compared by the comparing means, computation means for extracting the signal angle-of-arrival from the final set of resolved associated phases.

2. The apparatus of claim 1, wherein the phases in the associated phase set are linked to ESM parameter measurements, other than phase, made on the pulses, and the subsequent linked data stored as a single emitter report in an Active Emitter File (AEF).

3. The apparatus of claim 1 wherein the phase ambiguity resolution logic utilizes each measured frequency $f_i$ in conjunction with an arbitrary fixed fictitious frequency measurement $f_o$ to associate an equivalent virtual interferometer, this virtual interferometer having the property that its designed antenna spacings provide, for the same emitter signal angle-of-arrival, signal phase identical (within system measurement error) on the equivalent baseline at frequency $f_o$ to the signal phase measured at $f_i$ on the associated physical baseline, and utilizing fixed-frequency interferometer ambiguity resolution logic to find the integers resolving the phases measured on the equivalent interferometer baseline, and employs associative logic to assign these integer values to the corresponding phases on the physical array, and thereby resolve the diverse-frequency interferometer phase measurement ambiguities.

4. The apparatus of claim 1, wherein the selection logic creates a new equivalent virtual array by combining the associated phase set with the test phase, and appends a new baseline to the previous virtual array baseline set, such that the new baseline length, at fictitious frequency $f_o$, gives the same phase measurement as the ambiguous phase being tested and the comparing means compares the subset of integer phase ambiguities on the new virtual array with the corresponding integer phase ambiguity set on the associated phase equivalent array, and includes the test phase in the associated phase set if the comparison is exact.

5. The apparatus of claim 3, wherein the selection logic creates a new equivalent virtual array by combining the associated phase set with the test phase, and appends a new baseline to the previous virtual array baseline set, such that the new baseline length, at fictitious frequency $f_o$, gives the same phase measurement as the ambiguous phase being tested and the comparing means compares the subset of integer phase ambiguities on the new virtual array with the corresponding integer phase ambiguity set on the associated phase equivalent array, and includes the test phase in the associated phase set if the comparison is exact.

6. The apparatus of claim 1, wherein the frequency measurement $f_o$ associated with the virtual interferometer is the average of the measured frequencies of all the phases used to form the equivalent virtual array.

7. The apparatus of claim 3, wherein the frequency measurement $f_o$ associated with the virtual interferometer is the average of the measured frequencies of all the phases used to form the equivalent virtual array.

8. The apparatus of claim 1, wherein the determined integer set is added to the associated measured phases to resolve the measurement ambiguities and the emitter angle-of-arrival found using these resolved phase measurements, comprising:

computation means to determine the signal angle-of-arrival from the resolved measured phases on all the equivalent baselines using a maximum likelihood estimator, logic to compare the emitter angle-of-arrival found from the associated-phase combined test-phase equivalent array, with the angle-of-arrival, or AOA, estimated from the associated phase set alone, and hence to further verify that the pulse sets having a unique ambiguity integer set intersection are from the same emitter by associating on the frequency agile emitter AOA.

9. The apparatus of claim 3, wherein the determined integer set is added to the associated measured phases to resolve the measurement ambiguities and the emitter angle-of-arrival found using these resolved phase measurements, comprising:

computation means to determine the signal angle-of-arrival from the resolved measured phases on all the equivalent baselines using a maximum likelihood estimator, logic to compare the emitter angle-of-arrival found from the associated-phase combined test-phase equivalent array, with the angle-of-arrival, or AOA, estimated from the associated phase set alone, and hence to further verify that the pulse sets having a unique ambiguity integer set intersection are from the same emitter by associating on the frequency agile emitter AOA.

10. The apparatus of claim 4, wherein the determined integer set is added to the associated measured phases to resolve the measurement ambiguities and the emitter angle-of-arrival found using these resolved phase measurements, comprising:

computation means to determine the signal angle-of-arrival from the resolved measured phases on all the equivalent baselines using a maximum likelihood estimator, logic to compare the emitter angle-of-arrival found from the associated-phase combined test-phase equivalent array, with the angle-of-arrival, or AOA, estimated from the associated phase set alone, and hence to further verify that the pulse sets having a unique ambiguity integer set intersection are from the same emitter by associating on the frequency agile emitter AOA.

11. The apparatus claim 1, wherein the relation between baselines on which the phase measurements in the associated set were made, and the frequencies measured on the corresponding pulses, are given by $$\begin{bmatrix} \phi_1 \\ \phi_2 \\ \vdots \\ \phi_n \end{bmatrix} = \frac{2\pi}{c} \begin{bmatrix} f_1 & 0 & 0 & \ldots & \ldots & 0 \\ 0 & f_2 & & \ldots & & 0 \\ \vdots & \vdots & \vdots & \vdots & \vdots & \vdots \\ 0 & \ldots & & & & 0 \\ 0 & 0 & \ldots & \ldots & 0 & f_n \end{bmatrix} \begin{bmatrix} \vec{d}_1 \\ \vec{d}_2 \\ \vdots \\ \vec{d}_n \end{bmatrix} \vec{u} + 2\pi \vec{n} + \vec{\varepsilon}_\phi$$

and the baselines of the equivalent virtual array are given by $$D'_{E_{array}} = \begin{bmatrix} \frac{f_1}{f_o} \vec{d}_1 \\ \frac{f_2}{f_o} \vec{d}_2 \\ \vdots \\ \frac{f_n}{f_o} \vec{d}_n \end{bmatrix}.$$

12. The apparatus claim 3, wherein the relation between baselines on which the phase measurements in the associated set were made, and the frequencies measured on the corresponding pulses, are given by $$\begin{bmatrix} \phi_1 \\ \phi_2 \\ \vdots \\ \phi_n \end{bmatrix} = \frac{2\pi}{c} \begin{bmatrix} f_1 & 0 & 0 & \ldots & \ldots & 0 \\ 0 & f_2 & & \ldots & & 0 \\ \vdots & \vdots & \vdots & \vdots & \vdots & \vdots \\ 0 & \ldots & & & \ldots & 0 \\ 0 & 0 & \ldots & \ldots & 0 & f_n \end{bmatrix} \begin{bmatrix} \vec{d}_1 \\ \vec{d}_2 \\ \vdots \\ \vec{d}_n \end{bmatrix} \vec{u} + 2\pi\vec{n} + \vec{\varepsilon}_\phi$$

and the baselines of the equivalent virtual array are given by $$D'_{Earray} = \begin{bmatrix} \frac{f_1}{f_o}\vec{d}_1 \\ \frac{f_2}{f_o}\vec{d}_2 \\ \vdots \\ \frac{f_n}{f_o}\vec{d}_n \end{bmatrix}.$$

13. The apparatus claim 4, wherein the relation between baselines on which the phase measurements in the associated set were made, and the frequencies measured on the corresponding pulses, are given by $$\begin{bmatrix} \phi_1 \\ \phi_2 \\ \vdots \\ \phi_n \end{bmatrix} = \frac{2\pi}{c} \begin{bmatrix} f_1 & 0 & 0 & \ldots & \ldots & 0 \\ 0 & f_2 & & \ldots & & 0 \\ \vdots & \vdots & \vdots & \vdots & \vdots & \vdots \\ 0 & \ldots & & & \ldots & 0 \\ 0 & 0 & \ldots & \ldots & 0 & f_n \end{bmatrix} \begin{bmatrix} \vec{d}_1 \\ \vec{d}_2 \\ \vdots \\ \vec{d}_n \end{bmatrix} \vec{u} + 2\pi\vec{n} + \vec{\varepsilon}_\phi$$

and the baselines of the equivalent virtual array are given by $$D'_{Earray} = \begin{bmatrix} \frac{f_1}{f_o}\vec{d}_1 \\ \frac{f_2}{f_o}\vec{d}_2 \\ \vdots \\ \frac{f_n}{f_o}\vec{d}_n \end{bmatrix}.$$

14. The apparatus of claim 1, wherein the phase ambiguities are found by disassociating both the frequency and the AOA contributions to the phase measurements from the ambiguity integer part by utilizing computation means to find the null space N of the frequency-scaled baseline vector $$D'_{Earray} = \begin{bmatrix} \frac{f_1}{f_o}\vec{d}_1 \\ \frac{f_2}{f_o}\vec{d}_2 \\ \vdots \\ \frac{f_n}{f_o}\vec{d}_n \end{bmatrix}$$

for each equivalent array set formed in the associated-phase test-phase comparison, computation means to form the vector dot product of each basis vector in this null space with the vector of ambiguous phase measurements, $$\vec{\phi} = \begin{bmatrix} \phi_1 \\ \phi_2 \\ \vdots \\ \phi_n \end{bmatrix}$$

computation means to form the vector dot product of all possible vectors of ambiguity integers $$\vec{m}_{test} = \begin{bmatrix} m_1 \\ m_2 \\ \vdots \\ m_n \end{bmatrix}$$

with each basis vector in this null space set, logic to compare the two resulting number arrays $N\,\vec{\phi}$ and $N\,\vec{m}_{test}$ of dot products and chose the particular $N\,\vec{m}_{test}$ closest to $N\,\vec{\phi}$ thus determining $\vec{m}_{test}$.

15. The apparatus claim 3, wherein the phase ambiguities are found by disassociating both the frequency and the AOA contributions to the phase measurements from the ambiguity integer part by utilizing computation means to find the null space N of the frequency-scaled baseline vector $$D'_{Earray} = \begin{bmatrix} \frac{f_1}{f_o}\vec{d}_1 \\ \frac{f_2}{f_o}\vec{d}_2 \\ \vdots \\ \frac{f_n}{f_o}\vec{d}_n \end{bmatrix}$$

for each equivalent array set formed in the associated-phase test-phase comparison, computation means to form the vector dot product of each basis vector in this null space with the vector of ambiguous phase measurements, $$\vec{\phi} = \begin{bmatrix} \phi_1 \\ \phi_2 \\ \vdots \\ \phi_n \end{bmatrix}$$

computation means to form the vector dot product of all possible vectors of ambiguity integers $$\vec{m}_{test} = \begin{bmatrix} m_1 \\ m_2 \\ \vdots \\ m_n \end{bmatrix}$$

with each basis vector in this null space set, logic to compare the two resulting number arrays $N\,\vec{\phi}$ and $N\,\vec{m}_{test}$ of dot products and chose the particular $N\,\vec{m}_{test}$ closest to $N\,\vec{\phi}$ thus determining $\vec{m}_{test}$.

16. The apparatus claim 4, wherein the phase ambiguities are found by disassociating both the frequency and the AOA contributions to the phase measurements from the ambiguity integer part by utilizing computation means to find the null space N of the frequency-scaled baseline vector $$D'_{Earray} = \begin{bmatrix} \frac{f_1}{f_o}\vec{d}_1 \\ \frac{f_2}{f_o}\vec{d}_2 \\ \vdots \\ \frac{f_n}{f_o}\vec{d}_n \end{bmatrix}$$

for each equivalent array set formed in the associated-phase test-phase comparison, computation means to form the vector dot product of each basis vector in this null space with the vector of ambiguous phase measurements, $$\vec{\phi} = \begin{bmatrix} \phi_1 \\ \phi_2 \\ \vdots \\ \phi_n \end{bmatrix}$$

computation means to form the vector dot product of all possible vectors of ambiguity integers with each basis vector in this null space set, logic to compare the two resulting number arrays $N\vec{\phi}$ and $N\vec{m}_{test}$ of dot products and chose the particular $N\vec{m}_{test}$ closest to $N\vec{\phi}$ thus determining $\vec{m}_{test}$.

17. The apparatus claim 7, wherein the phase ambiguities are found by disassociating both the frequency and the AOA contributions to the phase measurements from the ambiguity integer part by utilizing computation means to find the null space N of the frequency-scaled baseline vector $$D'_{Earray} = \begin{bmatrix} \frac{f_1}{f_o}\vec{d}_1 \\ \frac{f_2}{f_o}\vec{d}_2 \\ \vdots \\ \frac{f_n}{f_o}\vec{d}_n \end{bmatrix}$$

for each equivalent array set formed in the associated-phase test-phase comparison, computation means to form the vector dot product of each basis vector in this null space with the vector of ambiguous phase measurements, $$\vec{\phi} = \begin{bmatrix} \phi_1 \\ \phi_2 \\ \vdots \\ \phi_n \end{bmatrix}$$

computation means to form the vector dot product of all possible vectors of ambiguity integers $$\vec{m}_{test} = \begin{bmatrix} m_1 \\ m_2 \\ \vdots \\ m_n \end{bmatrix}$$

with each basis vector in this null space set, logic to compare the two resulting number arrays $N\vec{\phi}$ and $N\vec{m}_{test}$ of dot products and chose the particular $N\vec{m}_{test}$ closest to $N\vec{\phi}$ thus determining $\vec{m}_{test}$.

18. The apparatus of claim 14, wherein the set of E-array baselines is chosen to have the smallest number of ambiguities possible from the set of all feasible E-array baselines.

19. The apparatus of claim 14 where a maximum likelihood estimator is used to determine the most likely correct set of possible integers from the projection of the phase measurements on the null space associated with the frequency-scaled baseline vector by minimizing the error $N\vec{\phi} - N\vec{m}_{test}$ over all the possible integer sets $\vec{m}_{test}$.

20. The apparatus of claim 8 where the equivalent array baselines are chosen to include those having the greatest number of integer ambiguities in the clustered set, including resolving means to determine these ambiguities by predicting the integer values using the emitter angle-of-arrival found from the equivalent array set having the smallest number of integer ambiguities.

21. A method for simultaneously associating frequency-agile transmitter signals detected by an intercept receiver with the frequency-agile transmitter, and measuring the signal's AOA, using phases measured between antenna pairs at diverse frequencies, comprising:

connecting a receiver-phase detector unit across interferometer baselines to measure ambiguous phase, measuring signal frequency for each signal whose ambiguous phase is measured between interferometer antenna pairs, storing the phase, frequency and baseline length on which the phase was measured, choosing a subset from the set of all measured ambiguous phases such that one phase measurement is selected for each interferometer baseline, determining the integer, for each ambiguous phase measurement in this subset, such that when added to the ambiguous phase measurement this integer generates the resolved phase, correct to within the system measurement error, choosing a single phase from the set of remaining ambiguous phase measurements, each made at frequencies distinct to within the resolution of the frequency measurement device, and appending this new phase to the set of previously chosen ambiguous phases, repeating the steps of generating the ambiguity integers and resolving the phase ambiguities, comparing the integers found by the iterative logic with the integers resolving the smaller set of ambiguous phase measurements made by the selection logic, storing the new set of associated measured phases, the frequencies and interferometer baselines across which the phase measurements were made if the integer comparison is exact, or store the previous set of associated phases if the comparison is not exact, appending a single new phase measurement to the associated set, resolving the phases of the enlarged set, and comparing the ambiguity integers found for the enlarged set with those found for the previous set until all the frequency diverse measured phases have been compared by the comparing step, and extracting the signal AOA from the final set of resolved associated phases.

22. The method of claim 21, wherein determining step comprises:

utilizing each measured frequency $f_i$ in conjunction with an arbitrary fixed fictitious frequency measurement $f_o$ to associate an equivalent virtual interferometer, this virtual interferometer having the property that its designed antenna spacings provide, for the same emitter signal angle-of-arrival, signal phase identical (within system measurement error) on the equivalent baseline at frequency $f_o$ to the signal phase measured at $f_i$ on the associated physical baseline, and utilizing fixed-frequency interferometer ambiguity resolution logic to find the integers resolving the phases measured on the equivalent interferometer baseline, and employs associative logic to assign these integer values to the corresponding phases on the physical array, and thereby resolve the diverse-frequency interferometer phase measurement ambiguities.

23. The method of claim 22, comprising creating a new equivalent virtual array by combining the associated phase set with the test phase, and appending a new baseline to the previous virtual array baseline set, such that the new baseline length, at fictitious frequency $f_o$, gives the same phase measurement as the ambiguous phase being tested and the comparing means compares the subset of integer phase ambiguities on the new virtual array with the corresponding integer phase ambiguity set on the associated phase equivalent array, and includes the test phase in the associated phase set if the comparison is exact.

24. The method of claim 22, wherein the frequency measurement $f_o$ associated with the virtual interferometer is the average of the measured frequencies of all the phases used to form the equivalent virtual array.

25. The method of claim 22, wherein the determined integer set is added to the associated measured phases to resolve the measurement ambiguities and the emitter AOA found using these resolved phase measurements, comprising:

determining the signal AOA from the resolved measured phases on all the equivalent baselines using a maximum likelihood estimator, comparing the emitter AOA found from the associated-phase combined test-phase equivalent array, with the AOA estimated from the associated phase set alone, and hence to further verify that the pulse sets having a unique ambiguity integer set intersection are from the same emitter associating on the frequency agile emitter AOA.

26. The method of claim 24, wherein the determined integer set is added to the associated measured phases to resolve the measurement ambiguities and the emitter AOA found using these resolved phase measurements, comprising:

determining the signal AOA from the resolved measured phases on all the equivalent baselines using a maximum likelihood estimator, comparing the emitter AOA found from the associated-phase combined test-phase equivalent array, with the AOA estimated from the associated phase set alone, and hence to further verify that the pulse sets having a unique ambiguity integer set intersection are from the same emitter associating on the frequency agile emitter AOA.

27. The method of claim 22, wherein the relation between baselines on which the phase measurements in the associated set were made, and the frequencies measured on the corresponding pulses, are given by $$\begin{bmatrix} \phi_1 \\ \phi_2 \\ \vdots \\ \phi_n \end{bmatrix} = \frac{2\pi}{c} \begin{bmatrix} f_1 & 0 & 0 & \cdots & \cdots & 0 \\ 0 & f_2 & & \cdots & & 0 \\ \vdots & \vdots & \vdots & \vdots & \vdots & \vdots \\ 0 & \cdots & & & & 0 \\ 0 & 0 & \cdots & \cdots & 0 & f_n \end{bmatrix} \begin{bmatrix} \vec{d}_1 \\ \vec{d}_2 \\ \vdots \\ \vec{d}_n \end{bmatrix} \vec{u} + 2\pi \vec{n} + \vec{\varepsilon}_\phi$$

and the baselines of the equivalent virtual array are given by $$D'_{Earray} = \begin{bmatrix} \frac{f_1}{f_o} \vec{d}_1 \\ \frac{f_2}{f_o} \vec{d}_2 \\ \vdots \\ \frac{f_n}{f_o} \vec{d}_n \end{bmatrix}.$$

28. The method of claim 24, wherein the relation between baselines on which the phase measurements in the associated set were made, and the frequencies measured on the corresponding pulses, are given by $$\begin{bmatrix} \phi_1 \\ \phi_2 \\ \vdots \\ \phi_n \end{bmatrix} = \frac{2\pi}{c} \begin{bmatrix} f_1 & 0 & 0 & \cdots & \cdots & 0 \\ 0 & f_2 & & \cdots & & 0 \\ \vdots & \vdots & \vdots & \vdots & \vdots & \vdots \\ 0 & \cdots & & & & 0 \\ 0 & 0 & \cdots & \cdots & 0 & f_n \end{bmatrix} \begin{bmatrix} \vec{d}_1 \\ \vec{d}_2 \\ \vdots \\ \vec{d}_n \end{bmatrix} \vec{u} + 2\pi \vec{n} + \vec{\varepsilon}_\phi$$

and the baselines of the equivalent virtual array are given by $$D'_{Earray} = \begin{bmatrix} \frac{f_1}{f_o} \vec{d}_1 \\ \frac{f_2}{f_o} \vec{d}_2 \\ \vdots \\ \frac{f_n}{f_o} \vec{d}_n \end{bmatrix}.$$

29. The method of claim 22, wherein the phase ambiguities are found by disassociating both the frequency and the AOA contributions to the phase measurements from the ambiguity integer part by finding the null space N of the frequency-scaled baseline vector $$D'_{Earray} = \begin{bmatrix} \frac{f_1}{f_o} \vec{d}_1 \\ \frac{f_2}{f_o} \vec{d}_2 \\ \vdots \\ \frac{f_n}{f_o} \vec{d}_n \end{bmatrix}$$

for each equivalent array set formed in the associated-phase test-phase comparison, forming the vector dot product of each basis vector in this null space with the vector of ambiguous phase measurements, $$\vec{\phi} = \begin{bmatrix} \phi_1 \\ \phi_2 \\ \vdots \\ \phi_n \end{bmatrix}$$

computation means to form the vector dot product of all possible vectors of ambiguity integers $$\vec{m}_{test} = \begin{bmatrix} m_1 \\ m_2 \\ \vdots \\ m_n \end{bmatrix}$$

with each basis vector in this null space set, logic to compare the two resulting number arrays N $\vec{\phi}$ and N $\vec{m}_{test}$ of dot products and chose the particular N $\vec{m}_{test}$ closest to N $\vec{\phi}$ thus determining $\vec{m}_{test}$.

30. The method of claim 23, wherein the phase ambiguities are found by disassociating both the frequency and the AOA contributions to the phase measurements from the ambiguity integer part by finding the null space N of the frequency-scaled baseline vector $$D'_{Earray} = \begin{bmatrix} \frac{f_1}{f_o}\vec{d}_1 \\ \frac{f_2}{f_o}\vec{d}_2 \\ \vdots \\ \frac{f_n}{f_o}\vec{d}_n \end{bmatrix}$$

for each equivalent array set formed in the associated-phase test-phase comparison, forming the vector dot product of each basis vector in this null space with the vector of ambiguous phase measurements, $$\vec{\phi} = \begin{bmatrix} \phi_1 \\ \phi_2 \\ \vdots \\ \phi_n \end{bmatrix}$$

computation means to form the vector dot product of all possible vectors of ambiguity integers $$\vec{m}_{test} = \begin{bmatrix} m_1 \\ m_2 \\ \vdots \\ m_n \end{bmatrix}$$

with each basis vector in this null space set, logic to compare the two resulting number arrays N $\vec{\phi}$ and N $\vec{m}_{test}$ of dot products and chose the particular N $\vec{m}_{test}$ closest to N $\vec{\phi}$ thus determining $\vec{m}_{test}$.

31. The method of claim 28, wherein the phase ambiguities are found by disassociating both the frequency and the AOA contributions to the phase measurements from the ambiguity integer part by finding the null space N of the frequency-scaled baseline vector $$D'_{Earray} = \begin{bmatrix} \frac{f_1}{f_o}\vec{d}_1 \\ \frac{f_2}{f_o}\vec{d}_2 \\ \vdots \\ \frac{f_n}{f_o}\vec{d}_n \end{bmatrix}$$

for each equivalent array set formed in the associated-phase test-phase comparison, forming the vector dot product of each basis vector in this null space with the vector of ambiguous phase measurements, $$\vec{\phi} = \begin{bmatrix} \phi_1 \\ \phi_2 \\ \vdots \\ \phi_n \end{bmatrix}$$

computation means to form the vector dot product of all possible vectors of ambiguity integers $$\vec{m}_{test} = \begin{bmatrix} m_1 \\ m_2 \\ \vdots \\ m_n \end{bmatrix}$$

with each basis vector in this null space set, logic to compare the two resulting number arrays N $\vec{\phi}$ and N $\vec{m}_{test}$ of dot products and chose the particular N $\vec{m}_{test}$ closest to N $\vec{\phi}$ thus determining $\vec{m}_{test}$.

32. The method of claim 31, wherein the set of E-array baselines is chosen to have the smallest number of ambiguities possible from the set of all feasible E-array baselines.

33. The apparatus of claim 31, wherein a maximum likelihood estimator is used to determine the most likely correct set of possible integers from the projection of the phase measurements on the null space associated with the frequency-scaled baseline vector by minimizing the error N $\vec{\phi}$ −N $\vec{m}_{test}$ over all the possible integer sets $\vec{m}_{test}$.

34. The method of claim 25, wherein the equivalent array baselines are chosen to include those having the greatest number of integer ambiguities in the clustered set, including determining these ambiguities by predicting the integer values using the emitter AOA found from the equivalent array set having the smallest number of integer ambiguities.

* * * * *